United States Patent [19]

Brand

[11] 4,199,370

[45] Apr. 22, 1980

[54] WEATHER RESISTANT TITANIUM DIOXIDE PIGMENT HAVING IMPROVED OPTICAL PROPERTIES AND PROCESS FOR MAKING SAME

[75] Inventor: John R. Brand, Palmerton, Pa.

[73] Assignee: The New Jersey Zinc Company, Nashville, Tenn.

[21] Appl. No.: 24,483

[22] Filed: Mar. 26, 1979

Related U.S. Application Data

[63] Continuation-in-part of Ser. No. 886,864, Mar. 15, 1978, abandoned.

[51] Int. Cl.$^2$ .................................................. C09C 1/36
[52] U.S. Cl. .................................. 106/300; 106/308 B
[58] Field of Search ............................. 106/300, 308 B

[56] References Cited

U.S. PATENT DOCUMENTS 3,928,057  12/1975  DeColibus ........................... 106/300
4,075,031  2/1978  Allen ................................... 106/300

*Primary Examiner*—James Poer
*Attorney, Agent, or Firm*—Gregory J. Battersby; Thomas E. Harrison, Jr.

[57] ABSTRACT

A weather-resistant TiO$_2$ pigment having improved optical properties is provided. The pigment is substantially encapsulated with a coating of an amorphous, dense silica in an amount between about 1% and about 7%; a coating of a voluminous silica in an amount between about 1% and about 8%; and preferably a coating of a precipitated alumina in an amount between about 2% and about 8%. In a particularly preferred embodiment the pigment further includes an innermost coating of a precipitated alumina in an amount between about 0.2 and 0.6%, the percentages of silica and alumina being calculated as % SiO$_2$ and Al$_2$O$_3$ by weight, based on the final treated TiO$_2$ pigment. A process for manufacturing the pigment is further provided.

24 Claims, No Drawings

WEATHER RESISTANT TITANIUM DIOXIDE PIGMENT HAVING IMPROVED OPTICAL PROPERTIES AND PROCESS FOR MAKING SAME

RELATED APPLICATIONS

This is a continuation-in-part of application Ser. No. 886,864 filed on Mar. 15, 1978, now abandoned.

BACKGROUND OF THE INVENTION

The present invention relates generally to titanium dioxide pigments and, more particularly, to a titanium dioxide pigment containing hydrous silica and alumina and which can be used for opacifying latex paints and other organic coatings. More particularly, it relates to that class of such pigments sufficiently weather-resistant for use outdoors. Still more particularly, it relates to a $TiO_2$ pigment that possesses opacifying and weathering properties which allow it to be used economically in both interior and exterior paints.

Techniques for treating particulate rutile or anatase titanium dioxide with hydrous oxides such as those of silicon and aluminum to achieve either high opacifying power or outstanding weather-ability in coatings are well known. The application of hydrous silica to improve opacity is taught, for example, in U.S. Pat. Nos. 3,591,398 which issued to A. H. Angerman on July 6, 1971, and 3,410,708 which issued to W. J. McGinnis on Nov. 12, 1968. Typically, hydrous silica is applied in voluminous form by the addition of acid to an aqueous slurry of titanium dioxide containing sodium or potassium silicate. The application of hydrous silica so as to impart a marked improvement in weather-resistance is taught, for example, in U.S. Pat. Nos. 3,437,502 which issued to Alfred J. Werner on Apr. 8, 1969, and 2,885,366 which issued to R. K. Iler on May 5, 1959, and which describe the precipitation of a dense, amorphous silica coating by the slow addition of acid to a titanium dioxide slurry containing a soluble alkali-metal silicate.

The hiding or opacification exhibited by a titanium dioxide pigment in a paint film results from the scattering of light by the anatase or rutile particles. Particles which are crowded together in the film tend to scatter less efficiently, producing less opacity per unit of pigment than would be the case if the particles were so spaced apart that they could act in a more independent fashion. A voluminous silica treatment acts as a spacer to hold the pigment particles in such a favorable position, thereby enhancing their hiding efficiency.

The chalking of paint films during weathering is believed to be caused by the interaction of the organic binder or paint vehicle with the titanium dioxide pigment under the influence of light, particularly light in the ultraviolet region of the spectrum. This interaction causes decomposition of the paint film, thereby releasing the pigment particles which then appear as a white "chalk" upon the painted surface. The application of a dense amorphous silica substantially encapsulating each pigment particle creates an obstruction or barrier that isolates the titanium dioxide from physical contact with the organic binding medium, thereby diminishing the rate of photochemical degradation of the paint film.

Unfortunately, the voluminous silica coating which promotes better spatial relationships among the titanium dioxide particles and improves their hiding efficiency does not diminish contacts between the titanium dioxide and binder to a sufficient degree to impart acceptable resistance to the effects of weather. Further, the dense silica coating which imparts weather-resistance does not provide sufficient inter-particle spacing to achieve a high level of hiding efficiency.

Since it is desirable to maximize both the hiding efficiency and the weather-resistance of $TiO_2$ pigments used in paint films, a number of attempts have been made to achieve that end. One approach relies on the application of a heavy coating or coatings of dense silica followed by a treatment with hydrous alumina to improve the wettability and dispersibility of the pigment particles. Heavy coatings of dense silica, however, are not as beneficial since, when applied to titanium dioxide slurried at practical concentration, they tend to cement the particles into aggregated structures which resist disintegration during the final milling of the pigment and its subsequent dispersion into paint. Pigments thus treated tend to exhibit a high oil absorption and a browner than optimal tint tone when evaluated by procedures such as those described in U.S. Pat. No. 3,342,424 which issued to W. R. Whately et al. on Sept. 19, 1967.

Paints designed for exterior use are often formulated to erode or chalk at a pre-determined rate so that a cleansing action occurs as the binder disappears. Aggregates released more slowly from the weathered surface tend to collect and hold dirt thus rendering the surface unsightly.

A second approach to $TiO_2$ pigments exhibiting both excellent hiding efficiency and good weather-resistance has been the application of a lesser coating of dense silica followed by a voluminous treatment of hydrous silica-alumina mixtures. This approach provides for the desired weatherability at suitable levels of oil absorption and tint tone, however it does not insure the requisite hiding efficiency.

Still another approach is described in U.S. Pat. No. 3,649,322 which issued to W. Foss on Mar. 14, 1972 which teaches a titanium dioxide pigment encapsulated with a dense coating of aluminum silicate and hydrous alumina. Although this treatment affords good weatherability, such pigments tend to exhibit a high oil absorption and a browner than optimal tint tone.

Against the foregoing background, it is a primary objective of the present invention to provide a titanium dioxide pigment which possesses a high hiding efficiency and a weathering behavior that provides for a balance of durability with cleansing of the film.

It is another objective of the present invention to provide such a titanium dioxide pigment which may be used in both interior and exterior paints.

It is a further objective of the present invention to provide a titanium dioxide pigment treated with a two stage silica and an alumina coating.

It is yet still another objective of the present invention to provide a process for the surface treatment of titanium dioxide pigments with a two stage silica and an hydrous alumina surface treatment.

It is further still another objective of the present invention to provide a titanium dioxide pigment treated with two stage silica and two stage alumina coatings.

SUMMARY OF THE PRESENT INVENTION

To the establishment of these objects of the above objects and advantages, the present invention briefly comprises a weather-resistant, substantially encapsulated $TiO_2$ pigment having improved optical properties, The pigment is substantially encapsulated with a coating of an amphorous, dense silica in an amount between about 1% and 7%, coating of a high surface area voluminous silica in an amount between about 1% and 8%; and preferably a coating of a precipitated alumina in an amount between about 2% and about 8%. In a particularly preferred embodiment, the pigment includes as an inner most coating a layer of a percipitated alumina in an amount between about 0.2% and 0.6%, the percentages of silica and alumina being calculated at % $SiO_2$ and $Al_2O_3$ by weight, based on the weight of the treated pigment. A process for manufacturing the pigment is further provided.

DESCRIPTION OF THE PREFERRED EMBODIMENTS

The present invention contemplates a $TiO_2$ pigment in which each particle has been coated with a more or less continuous layer of dense silica to impart weather-resistance and a layer of fluffy or voluminous silica to improve hiding efficiency. The pigment is also preferably coated with a layer of hydrous alumina to enhance the wettability and dispersibility of the product. In a particularly preferred embodiment, the pigment is usually coated with a layer of precipitated alumina. The specific amounts of the silica and alumina are chosen to provide a balance between the various desirable pigmentary properties mentioned previously. The $TiO_2$ pigment of this invention may be produced by either batch or continuous processing and the following batch process is used to establish the most appropriate composition for any particular use.

A raw $TiO_2$ pigment prepared, for example, by a chloride-process reactor discharge produced by the vapor-phase oxidation of titanium tetrachloride, is slurried in water at from about 5% to about 40% by weight of solid and the degree of dispersion or flocculation is adjusted by, for example, raising the pH. The deflocculated slurry preferably contains between about 20% and about 30% solids, with a solids content by weight of about 25% being most preferred. A suitable reagent for defloculation is monoethanolamine although other conventional deflocculants can be used. A preferred reagent is an aqueous solution of one part sodium silicate and three parts sodium carbonate.

After classification to remove any gritty material, the slurry is introduced into a stirred vessel and heated to about 90° C., preferably with steam. The pH of the slurry is then lowered to between about 2 and about 5 and preferably between about 2 and about 3 by the addition of an acidic material such as, for example, sulfuric acid. At a pH of between 2 and about 5 a first addition of an aluminum containing material, preferably a 30% $Al_2O_3$ sodium aluminate solution, is made. Other aluminum containing materials which may be used include, for example, an aluminum sulfate solution or a solution of aluminum sulfate and sodium aluminate. In a preferred embodiment, the aluminum containing material is added in an amount sufficient to introduce alumina onto pigment at a level between about 0.2 and 0.6% calculated as $Al_2O_3$ by weight based on the $TiO_2$ pigment. In a particularly preferred embodiment, a sufficient amount of sodium aluminate is added to achieve an alumina level of between about 0.4 and 0.5% $Al_2O_3$ and most preferably about 0.5% $Al_2O_3$.

The pH of the slurry is then adjusted to between about 9 and about 12 by the addition of a base such as sodium hydroxide. A preferred end-point pH for this adjustment is between about 9.5 and 10.5 and a most preferred end-point pH is about 10.0. While aqueous NaOH is the preferred reagent for the adjustment of the pH, it can also be adjusted upwardly by the addition of other bases including, for example, KOH.

Upon the adjustment of the pH of the $TiO_2$ slurry to between 9 and about 12, a first addition of a soluble silicate, preferably aqueous sodium silicate, is made to the slurry in an amount sufficient to achieve a dense silica level in the treated pigment of between about 1% and about 7% $SiO_2$ by weight based on the weight of the treated $TiO_2$ pigment. Preferably, an amount of aqueous sodium silicate should be added sufficient to achieve a level of dense silica in the $TiO_2$ between about 3% and about 5% $SiO_2$ and most preferably about 4% $SiO_2$. Preferably, a sodium silicate solution containing about 25% $SiO_2$ and having a ratio of $NaO_2:SiO_2$ of 1:3.22 is used and it has been determined that with such a silicate souce, approximately 0.16 pounds of sodium silicate per pound of finished pigment yields 4% $SiO_2$.

Following this first addition of the soluble silicate, the pH of the slurry is slowly adjusted downwardly to between about 3 and about 7 by the addition of 20% $H_2SO_4$. This downward adjustment of the pH should be preferably done over a period of at least about one hour and should preferably reduce the pH to between about 4 and about 6, the most preferred pH being about 5.

The slurry is then cured in the tank for approximately one-half hour or until the temperature has been reduced to about 80° C. While cooling can be accelerated, such as, for example, by dilution of the slurry with cold water or by passing cold water through surrounding outer jackets, it is preferred that the mixture cure or set for at least a sufficient period of time to permit the chemical reactions to approach equilibrium.

Upon the completion of this cure step, the pH of the slurry is then further reduced to between about 3 and about 5 and preferably to about 3 by the addition of 20% $H_2SO_4$. While 20% $H_2SO_4$ is preferred for this adjustment, other acidic reagents including, for example, HCl, $HNO_3$ and diethyl sulfate may be used at this and at all other steps in the process where downward pH adjustment is required.

After adjustment of the pH of the slurry to between about 3 and about 5, a second addition of a soluble silicate, preferably a 25% aqueous solution of sodium silicate is made. This second addition is made simultaneously with a sufficient amount of 20% $H_2SO_4$ to maintain a constant pH during the addition of this second silicate addition. In the preferred practice, a sodium silicate solution is added in an amount sufficient to achieve a level of fluffy or voluminous hydrous silica in the finished treated pigment equivalent to between about 2% and about 8% $SiO_2$. Most preferably, a sufficient amount of sodium silicate is added to achieve a voluminous hydrous silica level in the treated pigment of between about 4% and about 5% $SiO_2$ and most preferably a level of about 5% $SiO_2$. This second simultaneous addition of soluble silicate and $H_2SO_4$ may be made in one or more steps, if desired, provided that the total voluminous silica level falls within the above recited ranges. It has been determined that an amount of sodium silicate sufficient to achieve a level of 5% $SiO_2$ in the treated pigment is approximately 0.20 pounds of sodium silicate per pound of the finished pigment. Addition of the sodium silicate and the $H_2SO_4$ should be made as rapidly as possible, preferably simultaneously in two separate streams so that the hydrous silica precipitates instantaneously resulting in the formation of a voluminous silica coating.

The pH of the slurry is then raised to between about 3 and 7.0 and preferably to about 6.5 by the addition of 50% NaOH. With the pH of the slurry at between about 3 and about 7.0, a second addition of an aluminum coating material is made simultaneously with a material to maintain a constant pH. Preferably, a 25% $Al_2O_3$ sodium aluminate and 20% $H_2SO_4$ are simultaneously added in two separate streams. Other aluminum containing materials include an aluminum sulfate solution which would be added simultaneously with a base such as NaOH or aluminum sulfate and sodium aluminate may be simultaneously added. In the preferred embodiment, the $H_2SO_4$ is added in an amount sufficient to maintain a constant pH in the slurry, i.e. about 6.5 as hydrous alumina precipitates. The sodium aluminate or other aluminum containing material is added in an amount sufficient to introduce alumina into the treated pigment at a level between about 2% and about 8% calculated as $Al_2O_3$ by weight based on the $TiO_2$ pigment. Preferably an amount of sodium aluminate should be added to achieve an alumina level of between about 4% and about 6% $Al_2O_3$ and, most preferably, about 5% $Al_2O_3$.

The pH of the slurry is then raised to about 7.5 by the addition of a sufficient amount of 50% NaOH.

The pigment is then recovered from the slurry by conventional procedures, filtered, washed, dried and ground preferably in a micronizer. The treated pigment is then dispersed in an aqueous slurry, the solids content of which is between about 50% and about 75% by weight of the entire slurry and preferably between about 60% and about 65% by weight of solids or may be dry packaged.

The above process describes the production of the desired $TiO_2$ pigment by a batch process. It should be understood, however, that other means of producing the desired $TiO_2$ pigment can be used, such as, for example, a continuous process employing a series of overflow tanks. In such a process, the $TiO_2$ slurry may be pumped initially into a draft or mixing tube for the first addition of the previously recited amount of an aluminum-containing material. In the next stage, 50% NaOH is added to raise the pH of the slurry to about 10. The soluble silicate, preferably aqueous sodium silicate, is then added and the pH is gradually reduced to about 3 in subsequent stages. Gradual reduction of the pH may be effected in such a continuous process by the employment of at least about 2 and as many as about 5 stages, all of which together receive amounts sufficient of $H_2SO_4$ to gradually reduce the pH to about 3. When the pH in the mixture is maintained at about 3, the second addition of the previously stated amounts of sodium silicate solution and $H_2SO_4$ are made simultaneously with the pH still being maintained at about 3. The pH of the slurry is raised to about 6.5 and the mixture then passes into an additional tank wherein a second addition of an aluminum containing material, preferably sodium aluminate introduced simultaneously with $H_2SO_4$, in the amounts previously stated, is made. The pH is then adjusted to about 7.5 and the pigment is collected and processed in the manner previously described.

In the continuous process, fewer tanks may be employed if static mixers are used. Additionally, plug-flow apparatus can be employed wherein the entire treatment is done in a long continuous pipe or tube. In such a process, the reagents are injected into the pipe under pressure and mixing is effected by splitting and folding devices or by the use of static mixers.

Other processes which might be used in preparing the treated $TiO_2$ pigment include the absorption of a volatile aluminum compound such as anhydrous $AlCl_3$ upon the pigment which had previously received the two stage silica treatment. This may be effected in a fluidized bed followed by steam hydrolysis to produce the outer alumina coating.

The resultant $TiO_2$ pigment prepared by the above described processes is thus coated or substantially encapsulated with a thin inner coating of between about 0.2 and 0.6% alumina, a substantially impervious two-stage coating of hydrous silica including between about 1% to about 7% dense silica and between about 1% and about 8% voluminous silica and a one-stage outer coating of between about 2% and about 8% alumina. The percentages of silica and alumina are calculated as $SiO_2$ and $Al_2O_3$ by weight based on treated $TiO_2$ pigment weight. A preferred $TiO_2$ pigment produced by the above described processes includes a pigment which is coated with between about 0.4 and 0.5% alumina, between about 3% and about 5% dense silica, between about 4% and about 5% voluminous silica and between about 4% and about 6% alumina. Most preferably, the $TiO_2$ pigment produced by the above described processes has an inner coating of about 0.5% alumina, and an impervious coating including about 4% dense silica, about 5% voluminous silica and about 5% alumina.

The resultant coated $TiO_2$ pigment will, as a result of this treatment, further exhibit a high hiding power, generally not less than about 190 $ft^2$/lb and generally greater than about 195 $ft^2$/lb; a tint tone not browner than about $Br_{3.0}$; a titania solubility in hot $H_2SO_4$ not greater than about 14% and an oil absorption not greater than about 45 g/100 g $TiO_2$. It has been found that pigments which include a thin innermost coating of alumina results in a particularly high hiding power, generally in excess of 210 $ft^2$/lb while suffering only slight decreases in its other properties. More importantly, it has been found that the specific provision of an innermost coating of alumina in an amount between 0.2 and 0.6% $Al_2O_3$ results in a pigment having a high hiding efficiency while maintaining a low oil absorption, i.e. less than about 47 g/100 g $TiO_2$. Heretofore, increases in the hiding efficiency of a pigment resulted in corresponding increases in oil absorption.

Hiding efficiency is determined by measuring the tinting efficiency of the pigment in the following manner. A dispersion of attapulgite is first prepared:

| Ingredients | weight (grams) |
|---|---|
| water | 133 |
| ethylene glycol | 47 |
| attapulgite clay | 49 |
| Total | 189 grams |

A grinding medium consisting of the following is then prepared:

| Ingredients | weight (grams) |
|---|---|
| Clay Dispersion | 189 |
| water | 138 |
| Inorganic phosphate | 2 |
| Lecithin | 10 |
| Non-ionic surfactant | 2 |
| Defoamer | 6 |

-continued

| Ingredients | weight (grams) |
|---|---|
| Hydroxyethyl Cellulose | 30 |
| Total | 287 grams |

A pigment mixture consisting of the following is also prepared:

| Ingredients | weight (grams) |
|---|---|
| Calcium Carbonate | 25 |
| Clay | 100 |
| Diatomaceous Silica | 25 |
| TiO$_2$ | 270 |
| Total | 450 grams |

A tinted acrylic latex consisting of 64.5 g of a commercial paint grade latex containing 45% solids and 2.5 g of a universal colorant containing 42.5% lampblack is also prepared.

A quart grind can is charged with 287 grams of the grinding medium used, using a disperser at low speed, 420 grams of the pigment is added until the powders have become thoroughly wetted. The mixture is then ground for approximately 10 minutes and 156 grams of a 2½% solution of hydroxyethyl cellulose and 12 grams of the monoethylene ether of ethylene glycol are added and mixing is continued for an additional 10 minutes. The mixture is then split into two cans and into one is added 64.5 grams of the acrylic latex to make a white paint and into the other is added 67 grams of the tinted latex to make a gray paint. The cans are hand stirred for approximately 2 minutes and placed onto a mechanical shaker for an additional 5 minutes. The paints are then aged overnight and, the following day, spread on a Morest chart (Form 015) using a 0.003 inch Bird applicator. A standard paint is used as a reference or control. After air drying overnight the reflectance ($R_d$) and the undertone (a,b) values are determined using a Hunter Color Difference meter. The standard paint includes a standard commercial rutile pigment, Horsehead R-770 marketed by The New Jersey Zinc Company. The gray paints are used to determine the hiding efficiency of the test pigments relative to that of the R-770 standards indicated below.

The Kubelka-Munk theory of light scattering is applied to the $R_d$ values using the formula $(1-R_d\infty)^2/2R_d\infty = K/S$.

In order to determine the hiding efficiency, the $R_d$ values for both the test specimen and the standard are converted to K/S for each and then the K/S value for the standard is divided by the K/S value for the sample to give the result as percent of standard. The result for the test specimen is then multiplied by a numerical value assigned to the standard upon the basis of hiding power tests.

Tint tone tests are well known in the industry and are described, for example, in U.S. Pat. No. 3,342,424 which issued to W. R. Whately et al. on Sept. 19, 1967.

The measurement of the solubility of the titanium in the TiO$_2$ pigment in H$_2$SO$_4$ is used to assess the degree of encapsulation of the TiO$_2$ by the hydrous oxides added, these materials being insoluble in concentrated H$_2$SO$_4$. The test is conducted by heating stirred concentrated H$_2$SO$_4$ having a specific gravity of 1.84 grams/cc to 175° C. The TiO$_2$ pigment to be tested is then added and the temperature is maintained for approximately one hour. The resultant mixture of H$_2$SO$_4$ and TiO$_2$ is then cooled to ambient temperature and diluted with 100 ml of cool, deionized or distilled water to obtain a filterable mass. It is then filtered through a fritted glass funnel the residue being washed with 5% H$_2$SO$_4$. The filtrate and the washings are then transferred to a 500 ml erlenmeyer flask wherein 25 ml of concentrated HCl are added. The solution is then analyzed for titanium and the results are expressed as the percentage of the titania in the pigment found soluble under the conditions of this test.

Another test which may be employed to determine a useful physical property of the resultant TiO$_2$ pigments is an oil absorption test wherein 5 grams of the pigment are weighed, transferred to a glass plate and mixed with refined linseed oil, added drop by drop until exactly enough oil has been added to the pigment to produce a homogenous paste which can be picked up on a spatula without running off. The total time elapsed for working the oil into the pigment is generally about 7 minutes. The results of this test are expressed in grams of oil per 100 grams of pigment.

Additional useful tests include accelerated weathering of paint films in commercially available Weather-O-Meters such as for example, the Florida Cycle Weather-O-Meter and the Dew Cycle Weather-O-Meter, which are designed to measure the ability of a pigment to withstand weathering in a finished paint composition.

The following examples serve to illustrate certain preferred embodiments of the present TiO$_2$ pigment and processes for making same and are not to be construed as limiting the scope of the present invention.

EXAMPLE 1

In order to illustrate the pigment of the present invention as prepared by a batch process, a dispersed TiO$_2$ slurry was prepared by admixing 475 g of raw TiO$_2$ prepared by the chloride process with 2495 g of water. The slurry was deflocculated by adding a 1:3 mixture of sodium silicate and solium carbonate in water. After dilution to 16% solids and settling to remove coarse particles the slurry was then heated to 90° C. and the pH was adjusted to 10 by the addition of 3.6 ml 50% NaOH. 276 ml of 0.1 gram SiO$_2$/ml of a sodium silicate solution was added to yield a dense silica level of 5.0% SiO$_2$. The pH was then adjusted to 5.0 by the addition of 147 ml 10% H$_2$SO$_4$ over a period of 61 minutes.

The mixture was then cured for 30 minutes at 80° C. and the pH was adjusted to 3.0 by the addition of 14 ml of 10% H$_2$SO$_4$.

276 ml of the aforementioned sodium silicate solution was then added simultaneously with 140.4 ml of 10% H$_2$SO$_4$. This amount of sodium silicate was sufficient to yield a voluminous silica level of 5.0% SiO$_2$ in the finished pigment and the 140.4 ml of H$_2$SO$_4$ was sufficient to maintain the pH of the mixture at 3.0. The pH of the mixture was then adjusted to 6.5 by the addition of 10.5 ml of 20% NaOH.

To this mixture was added 276 ml of a 20% solution of sodium aluminate and 231.8 ml of 10% H$_2$SO$_4$. The amount of sodium aluminate added was sufficient to yield an alumina level of 5.0% Al$_2$O$_3$ in the final pigment and the 231.8 ml H$_2$SO$_4$ was sufficient to maintain the pH at 6.5. The pH of the mixture was then adjusted to 8.5 by the addition of 19 ml of 20% NaOH. The pigment was then filtered, washed, dried and micronized in a conventional manner.

The resultant substantially encapsulated pigment having a 5% SiO$_2$ dense silica coating; a 5% SiO$_2$ voluminous silica coating and a 5% Al$_2$O$_3$ alumina coating possessed the following properties:

| Hiding Efficiency | 200 ft$^2$/lb |
|---|---|
| Oil Absorption | 44 grams |
| Tint Tone | Br$_{3.0}$ |
| H$_2$SO$_4$ Solubility | 9.0% |

This pigment possessed good optical properties and would be weather resistant.

EXAMPLE 2

In order to demonstrate the preparation of a commercially available titanium dioxide pigment encapsulated with a relatively heavy one-stage coating of dense silica followed by alumina, the classified raw pigment slurry of Example 1 was prepared and treated in the following manner.

The temperature of the slurry was raised to 90° C. and the pH was raised to 10.0 by the addition of 2.6 ml of 50% sodium hydroxide. 563 ml of the sodium silicate solution used in Example 1 was added to yield a dense silica level of 10.0% SiO$_2$.

The pH of the mixture was gradually lowered to 5.0 by the addition of 278 ml of 10% sulfuric acid over a period of 56 minutes, and the slurry was cured at 80° C. for ½ hour. The pH of the mixture was then increased to 6.5 by the addition of 1.5 ml of 20% sodium hydroxide.

282 ml of the sodium aluminate solution of Example 1 was added to the mixture to yield an alumina level of 5.0% Al$_2$O$_3$. Additionally and simultaneously with the sodium aluminate, 254 ml of 10% sulfuric acid was added to maintain the pH at 6.5. The pH was then raised to 8.5 by the addition of 16 ml of 20% sodium hydroxide and the pigment recovered in the usual manner. The properties of this pigment substantially encapsulated with a 10% SiO$_2$ dense silica coating and a 5% Al$_2$O$_3$ alumina coating were as follows:

| Hiding Efficiency | 185 ft$^2$/lb |
|---|---|
| Oil Absorption | 37 grams |
| Tint Tone | Br$_4$ |
| H$_2$SO$_4$ Solubility | 10.5% |

This pigment which did not include the voluminous silica coating had a lower hiding efficiency and was browner than the pigment in Example 1.

EXAMPLE 3

In order to demonstrate the preparation of a titanium dioxide pigment having a dense silica coating plus a coating of mixed hydrous oxides of aluminum, silicon and titanium as known in the prior art, the classified slurry of Example 1 was treated in the following manner.

The slurry was heated to 90° C. and the pH adjusted to 10.0 by the addition of 1.8 ml of 50% sodium hydroxide. 288 ml of the aforementioned sodium silicate solution was added to achieve a dense silica level of 5% SiO$_2$ in the final pigment; the pH was reduced to 5.0 by the addition of 141 ml of 10% sulfuric acid over a period of 54 minutes; the mixture was cured at 70° C. and the pH adjusted to 5.0 by the addition of 2 ml of 20% sulfuric acid. 21.6 ml of an aqueous titanium tetrachloride solution (0.125 g TiO$_2$/ml) was added to introduce 1.25% TiO$_2$ into the final pigment.

230 ml of the sodium silicate solution was then added to achieve a silica level of 4% SiO$_2$ and 72 ml of the sodium aluminate solution to introduce 5% Al$_2$O$_3$; and the pH was then adjusted to 8 by the addition of 126 ml of 20% sulfuric acid. The pigment was recovered in the usual manner and possessed the following properties:

| Hiding Efficiency | 185 ft$^2$/lb |
|---|---|
| Oil Absorption | 43 grams |
| Tint Tone | Br$_4$ |
| H$_2$SO$_4$ Solubility | 10.0% |

The pigment had decreased efficiency and was browner than the pigment of Example 1.

EXAMPLE 4

In order to demonstrate the preparation of a pigment with a mixed alumina-silica coating, the classified slurry of Example 1 was heated to a temperature of 90° C. and the pH increased to 10.0 with 3.8 ml of 50% sodium hydroxide. Using the same solution reagents differently, 88 ml of sodium aluminate solution and 439 ml of sodium silicate solution were added to the slurry simultaneously and separately over a period of one hour. The quantities used were equivalent to additions of 2% Al$_2$O$_3$ and 8% SiO$_2$ in the finished product. The pH was then adjusted to 7.0 by the addition of 350 ml of 10% sulfuric acid and the batch was allowed to cure for 15 minutes.

220 ml of sodium silicate and 207 ml of sulfuric acid were then added, keeping the slurry at a constant pH of 7.0, to introduce another 4.0% Al$_2$O$_3$. After curing for 15 minutes, the pigment was recovered in the usual manner. Its properties are as follows:

| Hiding Efficiency | 195 ft$^2$/lb |
|---|---|
| Oil Absorption | 35 grams |
| Tint Tone | Br$_3$ |
| H$_2$SO$_4$ Solubility | 15.2% |

The above prepared pigment, while having a good hiding efficiency and optical properties, had a poor solubility in sulfuric acid.

EXAMPLE 5

In order to demonstrate the physical properties of the resultant two stage silica plus alumina encapsulated pigment of the present invention and other treated or coated TiO$_2$ pigments, the product of Example 1 was compared with other treated TiO$_2$ pigments. The results are as follows:

| Product | Hiding Efficiency | Oil Absorp. | Tinting Strength | H$_2$SO$_4$ Solubility |
|---|---|---|---|---|
| 2 stage silica/alumina of Example 1 | 200 ft$^2$/lb | 44.0g | Br$_3$ | 9.0% |
| Dense coating of 10% dense silica and voluminous coating of 5% alumina | 185 ft$^2$/lb | 37.0g | Br$_4$ | 10.5% |
| Dense coating of 5% dense silica and |  |  |  |  |

| Product | Hiding Efficiency | Oil Absorp. | Tinting Strength | $H_2SO_4$ Solubility |
|---|---|---|---|---|
| voluminous coating of 1% titania, 4% voluminous silica and 5% alumina | 185 ft$^2$/lb | 43g | Br$_4$ | 10.0% |
| Dense coating of 2% alumina and 8% silica co-precipitated as dense aluminum silicate and voluminous coating of 4% alumina | 195 ft$^2$/lb | 35g | Br$_3$ | 15.2% |

The example indicates that the pigment of the present invention exhibits an improved balance of properties over currently available pigments. This is evidenced by the higher efficiency, more impervious durability, a lower brown tint tone and an acceptable level of oil absorption.

EXAMPLE 6

In order to demonstrate the preparation of a substantially encapsulated pigment having different silica and alumina levels than the pigment of Example 1, a raw $TiO_2$ pigment was treated in the same manner as Example 1 except sufficient amounts of sodium silicate solutions and sodium aluminate were added to achieve a dense silica level of 2% $SiO_2$; a voluminous silica level of 7½% $SiO_2$ and an alumina level of 7½% $Al_2O_3$ based on the weight of the treated pigment. When tested, the pigment possessed the following properties:

| Hiding Efficiency | 197 ft$^2$/lb |
|---|---|
| Oil Absorption | 40 grams |
| Tint Tone | Br$_3$ |

While $H_2SO_4$ solubility was not tested, it is expected that it would be less than 12%.

EXAMPLE 7

In order to demonstrate the preparation of a substantially encapsulated pigment having different silica and alumina levels than the pigment of Examples 1 and 6, a raw $TiO_2$ pigment was treated in the same manner as Example 1 except sufficient amounts of sodium silicate solutions and sodium aluminate were added to achieve a dense silica level of 4% $SiO_2$; a voluminous silica level of 4% $SiO_2$ and an alumina level of 5% $Al_2O_3$ based on the weight of the treated pigment. When tested, the pigment possessed the following properties:

| Hiding Efficiency | 198 ft$^2$/lb |
|---|---|
| Oil Absorption | 37 grams |
| Tint Tone | Br$_3$ |
| $H_2SO_4$ Solubility | 8.9% |

EXAMPLE 8

In order to illustrate the pigment of the present invention prepared in a manner similar to the pigment of Example 1, a dispersed $TiO_2$ slurry was prepared by admixing 475 g of raw $TiO_2$ with 714 g of water and 2200 g of 50/70 mesh sand and then agitating it for 10 minutes. The sand was filtered and the slurry diluted to 20% solids with 1196 g of water. It was then allowed to settle for 10 minutes to remove any coarse particles.

The temperature of the slurry was then increased to 90° C. and the pH lowered to 2.5 by the addition of 19 ml of 10% $H_2SO_4$. 9.2 g of 29% $Al_2O_3$ sodium aluminate solution were then added to obtain an alumina level on the pigment of 0.5% $Al_2O_3$. The pH of the slurry was then raised to 10 by the addition of 3 ml of 50% NaOH whereupon 214 ml of a 0.1 g $SiO_2$/ml solution of sodium silicate was added to yield a dense silica level on the pigment of 4.0% $SiO_2$.

The pH of the slurry was then reduced to 5.5 by the slow addition of 105 ml of 10% $H_2SO_4$ at a constant rate over 59.5 minutes in order to precipitate a dense silica coating. The slurry was then maintained at this pH for 15 minutes at 80° C. 14 ml of 10% $H_2SO_4$ were then added to reduce the pH to 3.5 and 187 ml of a 0.1 g $SiO_2$/ml sodium silicate solution was added simultaneously with 62 ml of 10% $H_2SO_4$ to maintain the pH at 3.5 in order to yield a voluminous silica level of the pigment of 3.5%.

The pH of the slurry was then raised to 6.5 by the addition of 4.5 ml of 20% NaOH at which time 64.6 g of a 29% $Al_2O_3$ sodium aluminate solution was added simultaneously with 202 ml of 10% $H_2SO_4$ to maintain the pH at 6.5 to yield an outer alumina coating of 3.5% $Al_2O_3$.

The pH of the slurry was then raised to 7.5 by the addition of 6.5 ml of 20% NaOH and the pigment was filtered, washed, dried and micronized by conventional means.

The resultant, substantially encapsulated pigment having a 0.5% $Al_2O_3$ alumina coating; a 4% $SiO_2$ dense silica coating; a 3.5% $SiO_2$ voluminous silica coating and a 3.5% $Al_2O_3$ alumina coating, possessed the following properties:

| Hiding Efficiency | 214 ft$^2$/lb |
|---|---|
| Oil Absorption | 45 g/100 g |
| Tint Tone | Br$_{2.4}$ |
| $H_2SO_4$ Solubility | 14.0 |

This pigment demonstrated superior optical properties and satisfactory weather resistant properties.

EXAMPLE 9

In order to illustrate an alternative preferred four stage pigment of the present invention prepared in a manner similar to the pigment of Example 8, a dispersed $TiO_2$ slurry was prepared by admixing 475 g of raw $TiO_2$ with 714 g of water and 2200 g of 50/70 mesh sand and then agitating it for 10 minutes. The sand was filtered and the slurry diluted to 20% solids with 1196 g of water. It was then allowed to settle for 30 minutes to remove any coarse particles.

The temperature of the slurry was then increased to 90° C. and the pH lowered to 2.5 by the addition of 13 ml of 10% $H_2SO_4$. 9.3 g of 29.0% $Al_2O_3$ sodium aluminate solution were then added to obtain an alumina level on the pigment of 0.5% $Al_2O_3$. The pH of the slurry was then raised to 10.0 by the addition of 2.5 ml of 50% NaOH whereupon 217.2 ml of a 0.1 g $SiO_2$/ml solution of sodium silicate was added to yield a silica level on the pigment of 4.0% $SiO_2$.

The pH of the slurry was then reduced to 5.5 by the slow addition of 90 ml of 10% $H_2SO_4$ at a constant rate over 58 minutes in order to precipitate a dense silica coating. The slurry was then maintained at this pH for 15 minutes at 80° C. 15 ml of 10% $H_2SO_4$ were then added to reduce the pH to 3.5 and 271.5 ml of a 0.1 g $SiO_2$/ml sodium silicate solution was added simultaneously with 105 ml of 10% $H_2SO_4$ to maintain the pH at 3.5 in order to yield a voluminous silica level of the pigment of 5.0%.

The pH of the slurry was then raised to 6.5 by the addition of 7.5 ml of 20% NaOH at which time 93.6 g of a 29.0% $Al_2O_3$ sodium aluminate solution was added simultaneously with 295 ml of 10% $H_2SO_4$ to maintain the pH at 6.5 to yield an outer alumina coating of 5.0% $Al_2O_3$.

The pH of the slurry was then raised to 7.5 by the addition of 9.0 ml of 20% NaOH and the pigment was filtered, washed, dried and micronized by conventional means.

The resultant, substantially encapsulated pigment having a 0.5% $Al_2O_3$ alumina coating; a 4% $SiO_2$ dense silica coating; a 5.0% $SiO_2$ voluminous silica coating and a 5.0% $Al_2O_3$ alumina coating, possessed the following properties:

| Hiding Efficiency | 214 ft$^2$/lb |
|---|---|
| Oil Absorption | 45.9g/100g |
| Tint Tone | Br$_{3.4}$ |
| $H_2SO_4$ Solubility | 10.8 |

This pigment demonstrated superior optical properties and satisfactory weather resistant properties.

EXAMPLE 10

In order to demonstrate the effect of using a different inner coating in addition to the dense and voluminous silica and alumina, the pigment of Example 9 was prepared in the same manner, however, instead of 9.2 g of 29% $Al_2SO_3$ sodium aluminate solution being added to yield a 0.5% $Al_2SO_3$ alumina coating, 21.7 ml of a 0.125 g $TiO_2$/ml solution of titanium tetrachloride was added to yield a 0.5% $TiO_2$ titania level. The resultant coated pigment had the following physical properties:

| Hiding Efficiency | 207 ft$^2$/lb |
|---|---|
| Oil Absorption | 50.0 g |
| Tint Tone | Br$_{2.4}$ |

The pigment demonstrated excellent optical properties and satisfactory weather resistant properties although the optical properties were not as good as the alumina coated pigment of Example 9.

EXAMPLE 11

In order to demonstrate the effects of using still a different inner coating than in Examples 9 and 10, the pigment of example 9 was prepared in the same manner however, instead of 9.2 g of 29% $Al_2O_3$ sodium aluminate solution being added to yield a 0.5% $Al_2O_3$ alumina coating, 27.2 ml of a 0.1 g $SiO_2$/ml solution of sodium silicate was added to yield a 0.5% $SiO_2$ silica level. The resultant coated pigment had the following physical properties:

| Hiding Efficiency | 207ft$^2$/lb |
|---|---|
| Oil Absorption | 47.5g/100g |
| Tint Tone | Br$_{3.4}$ |

The resultant pigment demonstrated excellent optical properties and satisfactory weather resistant properties although the optical properties were not as good as the alumina coated pigment of Example 9.

EXAMPLE 12

In order to demonstrate the effect of the inner coating of alumina on the resultant physical properties of the pigment, the pigment of Example 9 was prepared with no inner layer. The resultant pigment, which had a 4% $SiO_2$ dense silica coating; a 5% $SiO_2$ voluminous silica coating and a 5% $Al_2O_3$ alumina coating, possessed the following properties:

| Hiding Efficiency | 202 ft$^2$/lb |
|---|---|
| Oil Absorption | 45.9 g/100 g |
| Tint Tone | Br$_{3.4}$ |
| $H_2SO_4$ Solubility | 9.8 |

This illustrates the substantially improved optical properties obtained by the inclusion of the inner layer of alumina.

EXAMPLE 13

In order to demonstrate how the optical properties of the product of the present invention compares with the prior art, the $TiO_2$ pigment of Example 8 was treated in the manner taught in U.S. Pat. No. 4,075,031 to A. Allen. Specifically, the temperature of the slurry was raised to 90° C. and the pH increased to 9.5 by the addition of 1.5 ml of 50% NaOH. 193 ml of the sodium silicate solution of Example 8 was added to obtain a silica level of 3.5% $SiO_2$.

70 ml of 10% $H_2SO_4$ was then added over a period of 59.5 minutes to a pH of 7.5 to precipitate a dense silica coating of silica and the mixture was cured for 15 minutes at 80° C. The pH of the slurry was then adjusted to 7.0 by the addition of 1 ml of 10% $H_2SO_4$ and 276 ml of the sodium silicate solution was added to achieve a level of 5.0% $SiO_2$ on the pigment simultaneously with 102 ml of 10% $H_2SO_4$ to maintain the pH at 7.0.

By the addition of 2.5 ml of 20% NaOH, the pH of the slurry was adjusted to 7.8 and 99.8 ml of the sodium aluminate solution of Example 8 was added to achieve an alumina level of 5.25% $Al_2O_3$ simultaneously with 295 ml of 10% $H_2SO_4$ to maintain the pH of the slurry at 7.8.

After recovery, the pigment exhibited the following properties:

| Hiding Efficiency | 205ft$^2$/lb |
|---|---|
| Oil Absorption | 48g |
| Tint Tone | Br$_{2.4}$ |
| $H_2SO_4$ Solubility | 11.0 |

A comparison of the properties of the resultant pigment at U.S. Pat. No. 4,075,031 and of the four stage pigments of Examples 8, 9 and 12 illustrate the advance achieved by the pigments including the inner coating of alumina. The pigments having an inner coating of alumina each had a hiding efficiency of 214 ft$^2$/lb compared with 202 ft$^2$/lb for the same pigment without the coating and 205 ft$^2$/lb for the Allen pigment. These four stage pigments, however, also maintained low oil absorption (45 and 45.9 g/100 g). Typically, hiding efficiency increases with oil absorption. The results shown in Examples 8, 9, 12 and 13 however, indicate that the presence of the alumina inner layer permits both high hiding efficiency and low oil absorption.

Although the foregoing Examples illustrate the formation of certain specific $TiO_2$ pigments possessing certain physical properties, it will be appreciated that the teachings of this application encompass broader and other combinations than recited in these Examples. Accordingly, the present invention should be limited only by the true scope of the appended claims.

Wherefore I claim:

1. A substantially encapsulated weather-resistant pigment having improved optical properties consisting of pigmentary $TiO_2$ having an innermost coating of alumina in an amount between about 0.2% and 0.6% and outer coatings of amorphous, dense silica in an amount between about 1% and about 7%; voluminous silica in an amount between about 1% and about 8%; and precipitated alumina in an amount between about 2% and about 8%, the precentages of silica and alumina being calculated as $SiO_2$ and $Al_2O_3$ by weight based on the weight of the treated pigment.

2. The substantially encapsulated pigment of claim 1 wherein said amorphous dense silica is the reaction product of sodium silicate and an acid.

3. The substantially encapsulated pigment of claim 1 wherein said voluminous silica is the reaction product of sodium silicate and an acid.

4. The substantially encapsulated pigment of claim 1 wherein said precipitated alumina is the reaction product of sodium aluminate and an acid.

5. A slurry including between about 50% and about 75% by weight of a solids portion of a substantially encapsulated pigment consisting of a pigmentary $TiO_2$ having an innermost coating of alumina in an amount between about 0.2% and 0.6% and outer coatings of amphorous dense silica in an amount between about 1% and about 7%; voluminous silica in an amount between about 1% and about 8%; and precipitated alumina in an amount between about 2% and about 8%, the precentages of silica and alumina being calculated as $SiO_2$ and $Al_2O_3$ by weight based on the weight of the treated pigment.

6. A substantially encapsulated weather-resistant pigment having improved optical properties consisting of pigmentary $TiO_2$ having an innermost coating of alumina in an amount between about 0.4% and 0.5% and outer coatings of amorphous, dense silica in an amount between about 3% and about 5%; voluminous silica in an amount between about 4% and about 6%; and precipitated alumina in an amount between about 4% and about 6%, the percentages of silica and alumina being calculated as $SiO_2$ and $Al_2O_3$ by weight based on the weight of the treated pigment, said substantially encapsulated pigment having a hiding efficiency of at least about 210 $ft^2/lb$ and an oil absorption less than about 47 g/100 g.

7. A method for producing a substantially encapsulated weather-resistant pigment having improved optical properties, said method comprising the steps of treating an aqueous slurry of a raw $TiO_2$ pigment by:

making a first addition of an aluminum containing material to said slurry in an amount sufficient to achieve an alumina level on said treated pigment of between about 0.2% and 0.6% calculated as $Al_2O_3$ by weight based on the weight of the treated pigment;

making a second addition of a soluble silicate to said slurry in an amount sufficient to achieve a dense silica level in the treated pigment of between about 1% and about 7% calculated as $SiO_2$ by weight based on the weight of the treated pigment while the pH of the slurry is maintained between about 9 and about 12;

gradually reducing the pH of the slurry to between about 3 and about 7;

making a third addition of a soluble silicate to said slurry in an amount sufficient to achieve a voluminous silica level in the treated pigment of between about 1% and about 8% calculated as $SiO_2$ by weight based on the weight of the treated pigment which the pH of the slurry is maintained between about 3 and about 7;

making a fourth addition of an aluminum containing compound to said slurry in an amount sufficient to achieve an alumina level in the treated pigment of between about 2% and about 8% calculated as $Al_2O_3$ by weight based on the weight of the treated pigment;

substantially neutralizing the slurry; and isolating and milling the treated pigment.

8. The method of claim 7 wherein said aluminum containing material is sodium aluminate and wherein said sodium aluminate is added in an amount sufficient to achieve a level of alumina in the treated pigment between about 0.4% and about 0.5% $Al_2O_3$.

9. The method of claim 7 wherein said soluble silicate is sodium silicate.

10. The method of claim 9 wherein said soluble sodium silicate is added in the second addition in an amount sufficient to achieve a level of dense silica in the treated pigment of between about 4% and about 5% $SiO_2$.

11. The method of claim 7 wherein the first addition of soluble silicate is made at a temperature of between about 80° C. and about 100° C.

12. The method of claim 11 wherein the temperature is maintained by the introduction of a sufficient amount of steam into the slurry.

13. The method of claim 7 wherein the pH of said slurry is between about 9.8 and about 10.5 prior to the first and second additions.

14. The method of claim 13 wherein the pH is maintained by the introduction of an hydroxide selected from the group consisting of sodium hydroxide and potassium hydroxide.

15. The method of claim 7 further including the step of curing the slurry for at least 30 minutes prior to the third addition of amorphous silicate.

16. The method of claim 7 wherein the soluble silicate of the third addition is sodium silicate.

17. The method of claim 7 wherein said third addition of a soluble silicate is made in more than one step to achieve a total voluminous silica level of between about 1% and about 8% $SiO_2$.

18. The method of claim 16 wherein an amount sufficient of sodium silicate is added in the third addition to achieve a voluminous silica level of between about 4% and about 5% $SiO_2$.

19. The method of claim 7 wherein the pH of the slurry is maintained at between about 3 and about 7 during the third addition of soluble silicate by the simultaneous introduction of an amount sufficient of $H_2SO_4$ into the slurry.

20. The method of claim 7 wherein said aluminum containing compound of the fourth addition is sodium aluminate.

21. The method of claim 20 wherein said sodium aluminate is added in an amount sufficient to yield an alumina level of between about 4% and about 6% $Al_2O_3$.

22. The method of claim 7 wherein said aluminum containing compound of the fourth addition is added simultaneously with $H_2SO_4$ to maintain the pH between about 3 and about 6.5.

23. A method for producing a substantially encapsulated weather-resistant pigment having improved optical properties, said method comprising the steps of treating an aqueous slurry of a raw $TiO_2$ pigment containing between about 20% and about 30% by weight of solids by:

adding an amount sufficient of a sodium aluminate solution to achieve an alumina level in the treated pigment of between about 0.4% and 0.5% calculated as $Al_2O_3$ by weight based on the weight of the treated pigment, increasing the pH of the slurry to between about 9.5 and about 10.5;

adding an amount sufficient of a sodium silicate solution to achieve a dense silica level in the treated pigment of between about 3% and about 5% calculated as $SiO_2$ by weight based on the weight of the treated pigment while said slurry is maintained at a pH of between about 9.5 and about 10.5;

gradually reducing the pH of the slurry to between about 4 and about 6 by the addition of a sufficient amount of $H_2SO_4$;

curing the slurry for a sufficient amount of time to permit the chemical reactions to approach equilibrium;

further reducing the pH to between about 3 and about 5 by the addition of a sufficient amount of $H_2SO_4$;

rapidly adding a second amount sufficient of a sodium silicate solution to achieve a voluminous silica level in the treated pigment of between about 4% and about 6% calculated as $SiO_2$ by weight based on the weight of the treated pigment, the addition of said second amount of sodium silicate being made simultaneously with the addition of an amount sufficient of $H_2SO_4$ to maintain a constant pH;

raising the pH of the slurry to about 6.5 by the addition of an amount sufficient of NaOH;

adding an amount sufficient of a sodium aluminate solution to achieve an alumina level in the treated pigment of between about 4% and about 6% calculated as $Al_2O_3$ by weight based on the weight of the treated pigment, said addition of a sodium aluminate solution being made simultaneously with the addition of an amount sufficient of $H_2SO_4$ to maintain a constant pH;

neutralizing the slurry; and isolating and milling the treated pigment.

24. The product produced by the method of claim 23.